United States Patent [19]

Cooper

[11] Patent Number: 4,693,487

[45] Date of Patent: Sep. 15, 1987

[54] STEERING KNUCKLE AND SPINDLE ASSEMBLY

[76] Inventor: Randy G. Cooper, 7405 Refugee Rd., Pickerington, Ohio 43147

[21] Appl. No.: 794,074

[22] Filed: Nov. 1, 1985

[51] Int. Cl.$^4$ .............................................. B62D 7/18
[52] U.S. Cl. .................................... 280/96.1; 280/661
[58] Field of Search ......................... 280/96.1, 93, 661

[56] References Cited

U.S. PATENT DOCUMENTS 2,428,651 10/1947 Buese .................................. 280/96.1
3,441,288 4/1968 Boughner ........................... 280/96.1

Primary Examiner—Richard A. Bertsch
Attorney, Agent, or Firm—Mueller and Smith

[57] ABSTRACT

A spindle means having a spindle section and a steering knuckle adapted to be pivotally mounted by a king pin on a non-powered, rigid beam axle which provides a camber angle adjustment which may be carried out facilely, without bending the axle, and without requiring the use of additional parts.

12 Claims, 3 Drawing Figures

STEERING KNUCKLE AND SPINDLE ASSEMBLY

BACKGROUND OF THE INVENTION

Traditionally, large vehicles such as trucks and buses have their front steering wheels mounted on spindles at each end of a rigid beam axle. The spindles have integral steering knuckles and are connected pivotally to the ends of the axle beam by king pins which engage the steering knuckles so that the wheels may be turned to steer the vehicle. It is important to maintain the front wheels on these vehicles in proper alignment in order to minimize tread wear and thereby obtain the maximum tread mileage from the tires on these wheels. It has been observed that some radial tires have a tread life of approximately 200,000 miles when mounted on front wheels which are maintained in proper alignment. It also has been observed that the tread life of the same radial tires may be shortened to as little as 40,000 miles when they are mounted on front wheels which are not maintained in proper alignment.

In setting the alignment of a steering wheel mounted at the end of a rigid beam axle, the camber angle and the toe angle of the wheel and the caster angle of the king pin are adjusted. Adjustments of toe angle and caster angle are relatively simple and may be achieved with the use of conventional equipment. However, the classical method of adjusting the camber angle of such a wheel requires the use of special equipment and is relatively complicated. The camber angle of a wheel may be defined as the angle the top of the wheel is offset from a line perpendicular to the ground which extends upwardly through the bottom of the wheel when the wheel is viewed from the front of the vehicle. It also may be defined as the angle the axis of the spindle which mounts the wheel is offset from a line parallel to the ground when the wheel is viewed from the front of the vehicle. In order to change the camber angle the top of the wheel must be moved inwardly towards the body of the vehicle or outwardly away from the body of the vehicle.

In a vehicle in which the steering wheels are not mounted on spindles attached to a rigid beam axle by king pins, the camber angle may be adjusted by inserting a shim between a spindle and a steering knuckle as described in U.S. Pat. No. 4,037,680 and U.S. Pat. No. 4,195,862. The vehicle described in these patents has a driving front axle, a steering knuckle mounted in ball joints at each end of the axle, and a spindle bolted to the steering knuckle. Using a shim to set the camber angle of a wheel has a number of disadvantages. One disadvantage is that it is difficult to position a shim between a spindle and a steering knuckle such that bolt holes in the shim are aligned with bolt holes in the spindle and in the steering knuckle so that bolts can be inserted in the holes to attach the spindle to the steering knuckle. Another disadvantage is that it is necessary to mantain an inventory of different sized shims to obtain different camber angle settings. A device for changing the angle of a spindle rigidly mounted on a nonsteering axle which utilizes a pair of tapered rings having toothed ends may be seen in U.S. Pat. No. 774,042.

In large vehicles having rigid beam axles, the spindles and steering knuckles traditionally are one-piece units which are mounted pivotally on the ends of the axle by king pins. Consequently, there are no assemblies between which shims may be inserted to adjust the camber angle in these units. One mechanism for adjusting the camber angle for a spindle and steering knuckle mounted on an axle by a king pin utilizes a sleeve having an eccentric king pin bore as described in U.S. Pat. No. 3,342,507. However, this mechanism requires a substantial number of parts and is complex. The classical method of moving the top of the wheel inwardly or outwardly to adjust the camber angle of a steering wheel on a rigid axle of a large vehicle entails bending the axle. The axle may be bent at its center to simultaneously move the tops of both wheels outwardly (to make the camber angles of both wheels more positive) or inwardly (to make the camber angles of both wheels more negative) or it may be bent at one or both ends to change the camber angle of one wheel or to change the camber angle of both wheels in opposite directions.

It is undesirable to bend rigid beam axles in order to change the camber angle of the front steering wheels for a number of reasons including the fact that the axle may break while it is being bent. Additionally, the seats for the front leaf springs in the vehicle are distorted when the axle is bent which may cause premature wear of the spring leaves which contact the seats. Also, when the spring seats are distorted, the springs are twisted and spring pins which pass through bushings mounted in the ends of the springs to anchor the springs, contact the outer ends of the bushings instead of the inner surfaces of the bushings and cause the bushings to wear prematurely. Furthermore, in some instances, an axle manufacturer will void the warranty of an axle which is bent to adjust the camber angles of wheels mounted thereon. In this situation the axle has to be replaced which is extremely expensive. In addition, special tools and equipment are required in order to bend an axle.

It is desirable to provide a spindle adapted to be pivotally mounted by a king pin on the non-powered, rigid beam axle of a vehicle which will support a steering wheel and which will permit the camber angle of the wheel to be adjusted facilely and inexpensively without bending the axle and without requiring the use of additional parts of special tools.

SUMMARY OF THE INVENTION

The present invention is addressed to a spindle means which is adapted to be mounted pivotally on a non-powered, rigid beam axle of a vehicle, which will support a steering wheel, and which will permit the camber angle of the wheel to be adjusted without bending the axle. The spindle means permits a camber angle adjustment to be carried out easily, inexpensively, and without additional parts or special tools. Additionally, the spindle may be replaced independently of the steering knuckle without removing the king pin from the steering knuckle.

It is an additional feature of the invention to provide a unitary spindle means adaptable pivotal for mounting on a non-powered, rigid beam axle by a king pin and for rotatably supporting a wheel which comprises two sections, a spindle section and a steering knuckle section. The spindle section has a stub shaft adapted to mount a wheel and a lateral support surface which is non-perpendicular to the axis of the stub shaft. The steering knuckle section is adapted to receive the king pin and has a lateral support surface which conformingly engages the spindle support surface. The spindle section is rotatable with respect to the steering knuckle section to adjust the camber angle of the stub shaft.

It is a further feature of the invention to provide a method of adjusting the camber angle of a wheel mounted on a spindle means adapted to be mounted pivotally on a non-powered, rigid beam axle by a king pin which comprises the steps of providing said spindle means being formed in two sections, a spindlee section having a stub shaft adapted to mount a wheel and having a lateral support surface which is non-perpendicular to the axis of said stub shaft and a steering knuckle section which is adapted to receive said king pin and which has a lateral support surface which conformingly engages said spindle support surface, said spindle being rotatable with respect to said steering knuckle section to adjust the camber angle of said stub shaft, and attaching means for rigidly attaching said spindle section to said steering knuckle section at a plurality of discrete locations to adjust said camber angle; removing said attaching means; rotating said spindle section with respect to said steering knuckle section to one of said discrete locations to obtain the desired camber angle; and fastening said attaching means to rigidly attach said spindle section to said steering knuckle section to maintain said desired camber angle.

Other features of the invention, in part, will be obvious and, in part, will appear hereinafter.

The invention, accordingly, comprises the apparatus and method possessing the construction, combination of elements, arrangement of parts, and steps which are exemplified in the following detailed description.

For a fuller understanding of the nature and features of the invention, reference should be had to the following detailed description taken in conjunction with the accompanying drawings.

DETAILED DESCRIPTION OF THE INVENTION

The present invention provides a steering knuckle and spindle assembly having two sections which assembly is adapted to be mounted pivotally by a king pin on a non-powered, rigid beam axle of a vehicle, which will support a wheel, and which will permit the camber angle of the wheel to be adjusted without bending the axle. The assembly permits a camber angle adjustment to be carried out easily, inexpensively, without using additional parts, and without using special tools.

Figure 1:
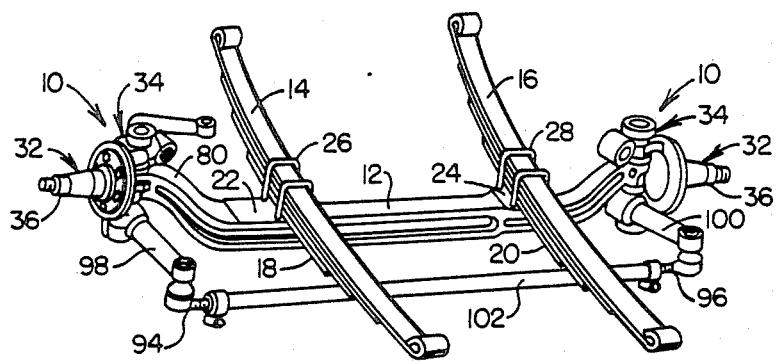
FIG. 1 is a view of a steering knuckle and spindle assembly of the present invention mounted on each end of a rigid beam axle.

Looking to FIG. 1, steering knuckle and spindle assembly 10 of the present invention is shown mounted by a pair of king pins on each end of a non-powered, rigid beam type axle 12. Axle 12 may be a reverse elliot axle and may have an I-beam cross section. A pair of leaf springs 14 and 16 have their inner leaves 18 and 20, respectively, mounted in spring seats 22 and 24, respectively, on axle 12. Springs 14 and 16 are secured to axle 12 by pairs of U-bolts 26 and 28, respectively, which overlie springs 14 and 16 and which have threaded ends which pass through holes in axle 12 and engage nuts, not shown.

Figure 3:
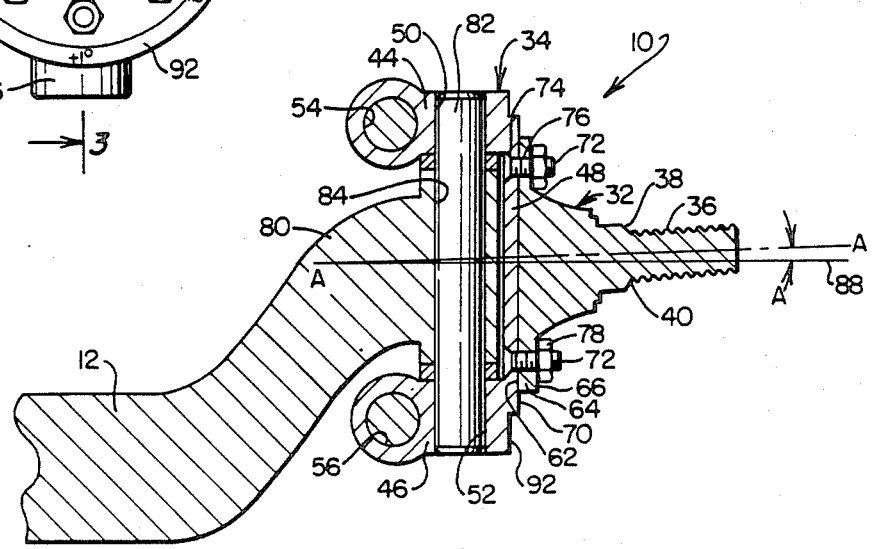
FIG. 3 is a cross-sectional view along line 3—3 of FIG. 2.

Turning to FIG. 3, it may be observed that steering knuckle and spindle assembly 10 includes spindle section 32 which is mounted on but detachable from steering knuckle section 34. Spindle section 32 is provided with stub shaft 36 which has an inner bearing seat 38 and an outer bearing journal 40 for mounting bearings which rotatably support a wheel, not shown. Steering knuckle section 34 generally is U-shaped and includes top leg 44 and bottom leg 46 which are joined by central plate 48. A pair of aligned, vertically extending king pins bores 50 and 52 having bushings, not shown, are formed in top and bottom legs 44 and 46, respectively. An upper steering arm eye 54 is formed in top leg 44 and lower steering arm eye 56 is formed in bottom leg 46. Eyes 54 and 56 normally are not parallel and steering knuckle section 34 is not symmetrical.

A lateral support surface 62 is formed on the bottom of base plate 64 on spindle section 32. Stub shaft 36 projects laterally from the top surface 66 of base plate 64. Lateral support surface 62 is angled with respect to top surface 66 and is non-perpendicular to the axis AA of stub shaft 36. When spindle section 32 is attached to steering knuckle section 34 to form steering knuckle and spindle assembly 10, lateral support surface 62 engages a complementary lateral support surface 70 formed on the outer surface of central plate 48. A plurality of bolts 72 pass through pairs of aligned bores 74 and 76 formed in central plate 48 and base plate 64, respectively, and engage nuts 78 to thereby rigidly assemble spindle section 32 to steering knuckle section 34.

Steering knuckle and spindle assembly 10 is secured pivotally to one end 80 of rigid beam axle 12 by king pin 82 which passes through a bushing in bore 50 in top leg 44 of steering knuckle section 34, through vertical king pin bore 84 in end 80 of axle 12, and through a bushing in bore 52 in bottom leg 46. When assembly 10 is secured to axle 12, spindle support surface 62 and steering knuckle support surface 70 are in a plane which is perpendicular to the ground. The camber angle of a wheel monted on a spindle affixed to a rigid beam axle by a king pin may be defined as the number of degrees the axis of the spindle is offset from a line which is parallel to the ground when the spindle is viewed from the front of the vehicle looking towards the rear of the vehicle. If the axis of the spindle lies along the line the camber angle is 0°. If the axis of the spindle forms an acute angle with respect to a line perpendicular to the ground, a wheel mounted on the spindle will have a negative camber angle. If the axis of the spindle forms an obtuse angle with respect to a line perpendicular to the ground, a wheel mounted on the spindle will have positive camber angle. Looking to FIG. 3, it may be observed that axis AA of stub shaft 36 forms an acute angle with respect to support surfaces 62 and 70 which are perpendicular to the ground. Consequently, a wheel mounted on spindle 32 will have a negative camber angle. The camber angle of a wheel mounted on spindle 32 will be angle A, i.e. the angle formed between horizontal line 88 and axis AA of stub shaft 36.

Figure 2:
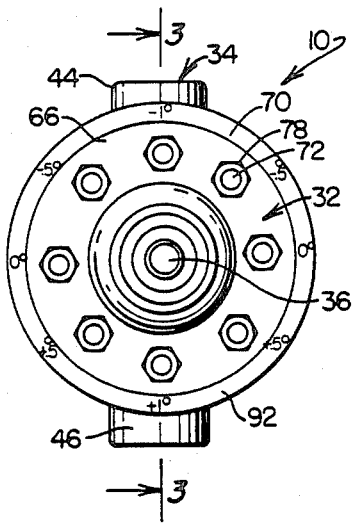
FIG. 2 is a side view of the steering knuckle and spindle assembly of the present invention.

Referring to FIG. 2, it may be observed that the eight bolt and nut assemblies 72 and 78 which assemble spindle section 32 and steering knuckle section 34 are equally spaced circumferentially about a common bolt circle. Consequently, spindle section 32 may be mounted onto steering knuckle section 34 at eight discrete angular positions. The camber angle of assembly 10 changes by the same amount, i.e. 0.5°, between adjacent angular positions. When spindle section 32 is positioned such that location T of base plate 64 is at the 12 o'clock position as illustrated in FIG. 2, spindle section 32 may be rotated to discrete angular positions with respect to steering knuckle section 34 to obtain additional camber angles of −0.5°, 0°, +0.5°, and +1° for assembly 10. The angles represented on surface 92 of steering knuckle section 34 represent the camber angle of steering knuckle and spindle assembly 10 when spindle section 32 is rotated such that point T is adjacent the bolt and nut assembly 72 and 78 at the indicated angle. It has been found that maximum negative and maximum positive camber angles of −1° and 1°, respectively, provide sufficient adjustment for most applications of steering knuckle and spindle assembly 10.

It may be observed that steering knuckle and spindle assembly 10 will have the same camber angle when spindle section 32 is at two non-adjacent discrete angular positions with respect to steering knuckle section 34. This occurs because axis AA of stub shaft 36 makes the same angle with respect to line 88 when point T is rotated by the same number of degrees clockwise or counter-clockwise from the 6 or 12 o'clock positions. It should be noted that although the camber angle of steering knuckle and spindle assembly 10 is the same when spindle 32 is moved clockwise or counter-clockwise by the same number of degrees from the 6 or 12 o'clock positions, the toe angle, i.e. the angle the front of the wheel makes with a horizontal line parallel to the center line of the vehicle, of assembly 10 is different. From this it is apparent that rotating spindle section 32 to obtain a desired camber angle will have the effect of changing the toe angle of a wheel mounted on spindle 32. It has been found that toe angle of assembly 10 may be partially corrected when spindle section 32 is rotated in a direction which will reduce toe angle error. It also has been found that the change of toe angle which occurs as a result of rotating spindle 32 to obtain the proper camber angle is not objectionable even if it causes an error in toe angle because toe angle can be easily adjusted. Referring to FIG. 1, the toe angle is adjusted by loosening both tie rod ends 94 and 96 affixed to the ends of lower steering arms 98 and 100, respectively, which are confined in lower steering arm eyes 56 of steering knuckle and spindle assemblies 10. Thereafter, tie rod 102 is rotated to move both tie rod ends 94 and 96 and their respective lower steering arms 98 and 100 inwardly or outwardly until the proper toe angles are obtained.

Although, in the embodiment described above bolts 72 pass through bores 74 and 76 in central plate 48 and base plate 64, respectively, to fasten spindle section 32 to steering knuckle 34, elongated slots could be substituted for bores 74 or 76. This would permit spindle section 32 to be rotated through a limited angle at each of the eight discrete positions to permit the camber angle of assembly 10 to be set more precisely. Furthermore, studs could be anchored in bores 74 which would eliminate the need to prevent bolts 72 from rotating when nuts 78 are turned thereon. Additionally, a counterbore may be formed in lateral mounting surface 70 of central plate 48 to receive spindle base plate 64. It is believed that mounting base plate 64 in a counterbore in central plate 48 may make assembly 10 more rigid.

In the preferred embodiment, axle 12 is depicted as a reverse elliot rigid beam angle. When a spindle and steering knuckle assembly is mounted on this type of axle the king pin is mounted in bushings which are inserted in bores 50 and 52 in steering knuckle 34. The steering knuckle and spindle assembly 10 of the present invention is applicable also to an elliot type rigid beam axle. An elliot axle has a yoke at each end which mounts a pair of king pin receiving bushings. The steering knuckle and spindle assembly which is utilized with an elliot axle has a steering knuckle with a central element which includes a single elongated king pin receiving bore which fits between the bushings in the end of the axle. Therefore, the term "steering knuckle" is intended to include one in which a pair of legs are joined by a central plate for use with a reverse elliot axle and one in which a central element has single king pin bore which is adapted to fit between a pair of bushings on an elliot type axle.

From the above it may be seen that the present invention provides a spindle means having a steering knuckle section and spindle section adapted to be pivotally mounted by a king pin on a non-powered, rigid beam axle of a vehicle which will support a wheel and which will permit the camber angle of the wheel to be adjusted without bending the axle and without using special tools or requiring additional parts.

Since certain changes may be made to the above-described apparatus without departing from the scope of the invention herein, it is intended that all matter contained in the description thereof or shown in the accompanying drawings shall be interpreted as illustrative and not in a limiting sense.

I claim:

1. In a non-powered, rigid beam, steering axle pivotally attached to a unitary spindle means having an integral steering knuckle which is attached to said axle by a king pin, the improvement for facilely adjusting the camber angle of said spindle means which comprises:
said spindle means being formed in two sections, a spindle section having a stub shaft adapted to mount a wheel and having a lateral support surface which is non-perpendicular to the axis of said stub shaft;
a steering knuckle section which is adapted to receive said king pin and which has a lateral support surface which conformingly engages said spindle support surface; and
attaching means for rigidly attaching said spindle section to said steering knuckle section at a plurality of discrete locations, said attaching means being removable so that said spindle section is rotatable with respect to said steering knuckle section to adjust the camber angle of said stub shaft.

2. The spindle means of claim 1 in which:
said spindle section has a plurality of equal angularly spaced bores; and
fastening means engage said spindle section bores to affix said spindle section to said steering knuckle section at a plurality of discrete angular locations.

3. The spindle means of claim 2 wherein said camber angle is incremented by the same number of degrees when said spindle section is rotated between each adjacent angular location.

4. The spindle means of claim 3 in which:
said camber angle is identical at two of said discrete angular locations; and
the toe angle of said stub shaft is different at said two locations where said camber angle is identical.

5. The spindle means of claim 2 in which said fastening means includes a plurality of bolts which pass through said spindle section bores and said steering knuckle bores and nuts which are threaded onto said bolts.

6. The spindle means of claim 1 in which:

said steering knuckle section includes a central plate;
said steering knuckle support surface is formed in said central plate;
said spindle section includes a base plate having a top surface and a bottom surface;
said stub shaft projects from said top surface; and
said spindle support surface is formed on said bottom surface.

7. The spindle means of claim 6 in which:
said central plate includes a plurality of equal angularly spaced threaded fasteners;
said base plate includes a plurality of equal angularly spaced bores which receive said fasteners; and
nuts are threaded onto said fasteners to secure said spindle section to said steering knuckle section.

8. The spindle means of claim 1 in which:
said steering knuckle support surface is located at the bottom of a counterbore formed in said knuckle;
said spindle section includes a flange having a top surface and a bottom surface;
said spindle support surface is formed on said bottom surface of said flange; and
said flange is received in said counterbore.

9. A method of adusting the camber angle of a wheel mounted on a spindle means adapted to be mounted pivotally on a non-powered, rigid beam axle by a king pin which comprises the steps of:
providing said spindle means being formed in two sections, a spindle section having a stub shaft adapted to mount a wheel and having a lateral support surface which is non-perpendicular to the axis of said stub shaft and a steering knuckle section which is adapted to receive said king pin and which has a lateral support surface which conformingly engages said spindle support surface, said spindle being rotatable with respect to said steering knuckle section to adjust the camber angle of said stub shaft;
attaching means for rigidly attaching said spindle section to said steering knuckle section at a plurality of discrete locations to adjust said camber angle;
removing said attaching means;
rotating said spindle section with respect to said steering knuckle section to one of said discrete locations to obtain the desired camber angle; and
fastening said attaching means to rigidly attach said spindle section to said steering knuckle section to maintain said desired camber angle.

10. The method of claim 9 wherein:
said steering knuckle section is provided with a central plate;
said steering knuckle support surface is provided on said central plate;
said spindle section is provided with a base plate having a top surface and a bottom surface;
said stub shaft is provided on said top surface; and
said spindle support surface is provided on said bottom surface.

11. The method of claim 10 wherein:
said central plate is provided with a plurality of equal angularly spaced threaded elements;
said base plate is provided with a plurality of bases which receive said threaded elements; and
said attaching means is provided to be a pluralit of nuts which are threaded onto said threaded elements.

12. The method of claim 9 wherein:
said steering knuckle section is provided with a plurality of equal angularly spaced threaded fasteners;
said spindle section is provided with a plurality of bores which receive said fasteners; and
said attaching means is provided to be nuts which are threaded onto said fasteners.

* * * * *